(12) United States Patent
Hamaguchi et al.

(10) Patent No.: US 6,996,534 B2
(45) Date of Patent: Feb. 7, 2006

(54) MEMBER REGISTRATION SYSTEM (75) Inventors: Kazumi Hamaguchi, Kawasaki (JP); Satoshi Masutomo, Kawasaki (JP); Yoko Kubota, Kawasaki (JP); Ryuta Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 676 days.

(21) Appl. No.: 09/725,213

(22) Filed: Nov. 29, 2000

(65) Prior Publication Data
US 2002/0010617 A1    Jan. 24, 2002

(30) Foreign Application Priority Data
Jul. 18, 2000    (JP)    .............................. 2000-217271

(51) Int. Cl.
*G06F 17/60*    (2006.01)
(52) U.S. Cl. .............................. 705/14; 705/1; 705/26; 705/27
(58) Field of Classification Search .................... 705/1, 705/14, 26, 27
See application file for complete search history.

(56) References Cited

U.S. PATENT DOCUMENTS 6,016,476 A * 1/2000 Maes et al. ..................... 705/1
6,496,855 B1 * 12/2002 Hunt et al. .................. 709/217
6,789,078 B2 * 9/2004 Saitou et al. .................. 707/10

FOREIGN PATENT DOCUMENTS

WO    WO 97/31322    *  8/1997

OTHER PUBLICATIONS

Dialog file 15 #01963760. "Missing the Internet boat?", Pete Hisey, Credit Card Management v12n9 pp 48-52, Dec. 1999.*

* cited by examiner

*Primary Examiner*—Raquel Alvarez
(74) *Attorney, Agent, or Firm*—Staas & Halsey LLP (57)    ABSTRACT

A customer computer receives, through radio communication, from a computer of a product or service provider (a provider), items of personal information necessary for member registration. Then, the customer computer extracts, from a storage device storing personal information for the customer in advance, customer personal information corresponding to the items of personal information received from the computer of the provider, and transmits the extracted personal information to the computer of the provider. Thereafter, the customer computer receives, from the computer of the provider, member identification information and stores the member identification information. Therefore, customer can transmit/register personal information to a product or service provider, without repeatedly writing or entering the same data. The storage device of the customer computer stores member identification information, so the customer does not have to carry a number of different point cards that were respectively issued for use at the stores.

3 Claims, 9 Drawing Sheets

Purchase information DB member ID
number of purchased products
date of purchase
volume
price

FIG.2D

Member information DB member ID
member name
address
e-mail address
telephone number
birth date
credit card type
credit card number
total purchase price
accumulated points

FIG.2C

Personal information DB

- name
- birth date
- gender
- job
- address
- postal code
- hobby
- family information
- bank code
- bank branch code
- bank account number
- credit card type
- credit card number
- telephone number
- e-mail address
- PIN number

FIG.3A

Registered retail store DB

- registered retail store ID
- retail store name
- telephone number
- address
- business category
- facsimile number
- URL
- member ID
- icon information
- icon location
- message information
- term of validity

MEMBER REGISTRATION SYSTEM

TECHNICAL FIELD OF THE INVENTION

The present invention relates to a member service system using the computer of a retail store and the computers of customers.

BACKGROUND OF THE INVENTION

Conventionally, retailers have long provided member services using point cards, and the use of membership or user cards in sports clubs and libraries also has a long history. To obtain such a point card, in most cases a customer must manually complete a specific application form, as designated by, for example, a retailer, and a salesperson employed by the retailer then refers to the completed application form to enter data into a retailer's terminal. If a customer performs the member registration via the Internet, the web server of a retailer transmits an input form to the terminal of the customer, and the customer then manipulates his or her terminal to complete the form and to return it to the retailer's web server for the registration processing in the web server.

SUMMARY OF THE INVENTION

However, when manually completing an application form or when entering data into an input form by the keyboard, a customer has to enter the same data, over and over again.

It is, therefore, one objective of the present invention to provide a technique for enabling customers to register themselves for product or service providers without tiresome procedures.

It is another objective of the present invention to provide a technique for enabling computers used by customers to effectively notify the customer of the presence of the product or service providers.

To achieve the above objectives, a computer (e.g., a portable terminal or a cellular phone) used by a customer comprises: a first receiver for receiving, from a computer of a product or service provider, items of personal information necessary for the member registration when performing the member registration; a transmitter for extracting, from a storage device storing personal information for the customer in advance, that customer personal information which corresponds to the items of personal information received from the computer of the product or service provider, and for transmitting the extracted customer personal information to the computer of the product or service provider; and a second receiver for receiving, from the computer of the product or service provider, member identification information and for storing the member identification information in the storage device.

With this configuration, the customer can transmit own personal information to product or service providers, without writing or entering the same data over and over again. Since the member identification information is retained in the storage device of the computer, the customer does not have to carry a number of different point cards, which were respectively issued for use at the stores. Further, radio communication between computers can provide improved convenience for the customers.

The computer further comprises: a third receiver for receiving, from the computer of the product or service provider, information concerning the product or service provider and an icon of the product or service provider, and for storing the received information and the icon in the storage device; and a display processor for displaying, on a display device, an image wherein the icon of the product or service provider is located in a virtual town.

With this configuration, since the icons of retailers are displayed in a virtual town, the retailers can effectively publicize their presence in the computer of the customer. Further, if advertisement information is included in the information concerning the product or the service provider and is also displayed, the advertising effects can be increased.

DETAIL DESCRIPTION OF THE PREFERRED EMBODIMENTS

Figure 1:
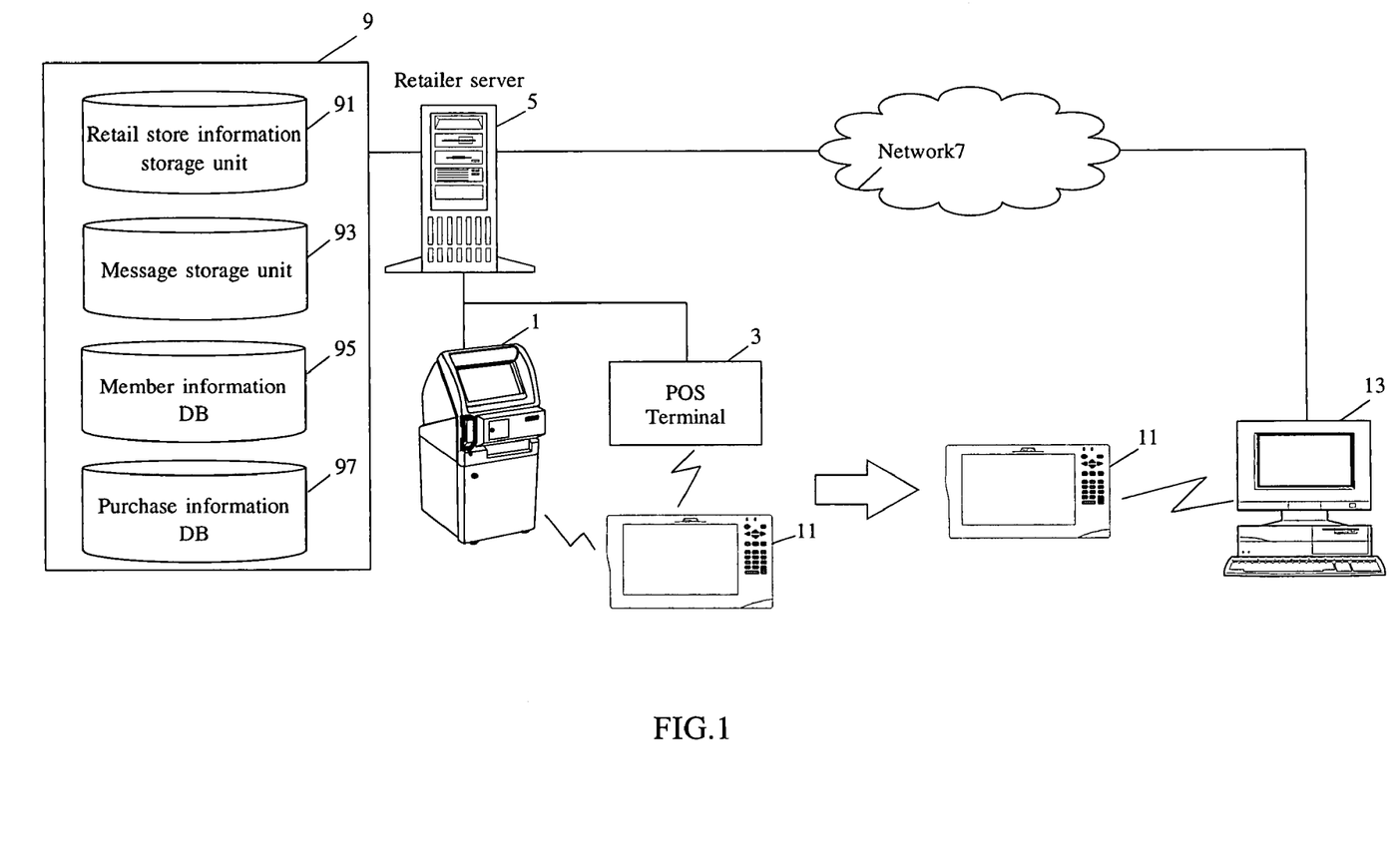
FIG. 1 is a diagram showing an overview of a system according to the present invention.

The overview of a system according to the preferred embodiment of the present invention will now be described while referring to FIG. 1. This system comprises: a retail store terminal 1, installed at the entrance to a store; a POS (Point-Of-Sale) terminal 3, installed at a counter for the payment; a retailer server 5, connected to the retail store terminal 1 and the POS terminal 3; a customer terminal 11, for communicating with the retail store terminal 1 and the POS terminal 3 by radio; and the personal computer (PC) 13 of a customer, for communicating with the customer terminal 11 by radio. The retailer server 5 also includes a web server function, and is connected to a network 7, the Internet, for example. The personal computer (PC) 13 of a customer that can execute a web browser is connected to the network 7 via an Internet service provider. The retailer server 5 is connected to a storage device 9 that includes a retail store information storage unit 91, a message storage unit 93, a member information Data Base (DB) 95 and a purchase information DB 97.

The retail store terminal 1 stores information concerning the store (a floor guide and special sale information) in itself in advance, so that a customer, by operating the retail store terminal 1, can obtain information about the store. In this embodiment, a customer also employs the retail store terminal 1 to register himself or herself as a member. The retail store terminal 1 can communicate in accordance with, for example, the short distance communication standards "Bluetooth", information concerning which is available at a World Wide Web site at bluetooth.com. It is also possible that infrared radio communication or communication performed in accordance with another radio communication standard may also be employed, and that, depending on the case, the retail store terminal 1 can communicate with the customer terminal 11 via wire.

The POS terminal 3 is installed at a counter for the payment of the purchase price for a product or a charge for a service, and is used to register items purchased by customers and the prices of the items. The POS terminal 3 can also communicate by radio with the customer terminal 11 using the Bluetooth communication standards. It is also possible that POS terminals 3 can also communicate with each other over wire, and that a customer can request the POS terminal 3 to perform a member registration process. The POS terminal 3 also communicates with the customer terminal 11 to refer to the current value of the points that are credited to a member customer at the time of registration or upon the purchase of a product, or to settle the payment for the purchased product.

The retailer server 5, which is connected to the retail store terminal 1 and the POS terminal 3, provides requested information in accordance with data inquiries received from the retail store terminal 1 and the POS terminal 3, and upon the receipt of data, stores the data in an appropriate storage unit in the storage device 9. If the retailer server 5 includes the web server function, as described above, it can, upon the receipt of a request from the customer PC 13, transmit advertisement information or event information via the network 7.

The retailer server 5 is also connected to the storage device 9. The information stored in the storage device 9 is shown in FIGS. 2A, 2B, 2C, and 2D. Information concerning the retail store is held in the retail store information storage unit 91 (FIG. 2A), and in this embodiment, the information concerning the retail store includes a retail store ID, a retail store name, a telephone number, an address, a business category, a facsimile number, a URL (Uniform Resource Locator), icon information (e.g., a pointer to an icon file), and the term of validity for these data, which may be added to or deleted, as needed. For example, an e-mail address to contact with the retailer may be included in this information, or the business category data may be deleted. Retail store advertisement information is stored in the message storage unit 93 (FIG. 2B), and if a member ID is issued, a message from the message storage unit 93 is transmitted with the member ID to the customer terminal 11. In this embodiment, message 1, message 2, . . . and message n are stored in the message storage unit 93.

Figure 2A:
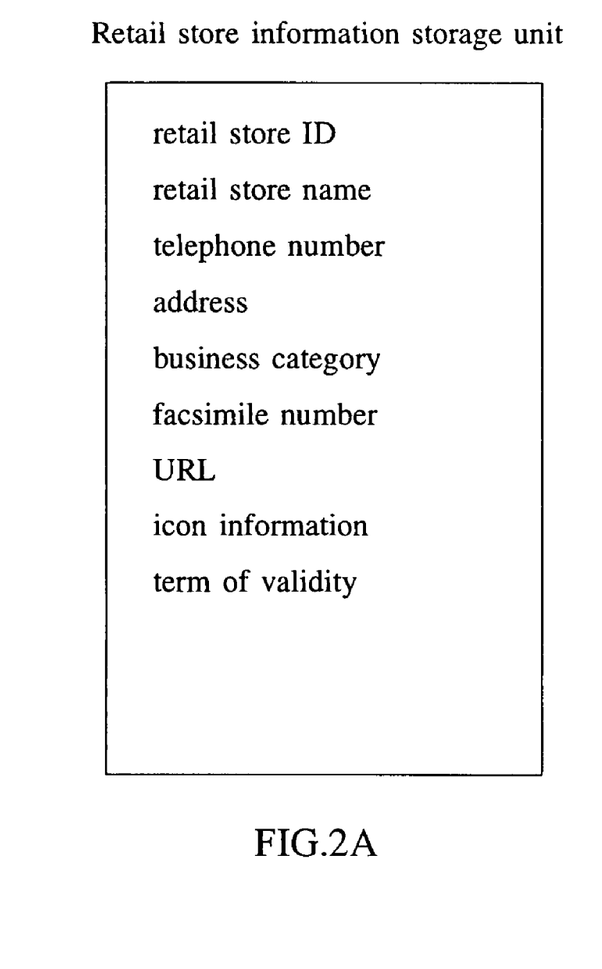
FIG. 2A is a diagram showing example data stored in retail store information storage unit.
Figure 2B:
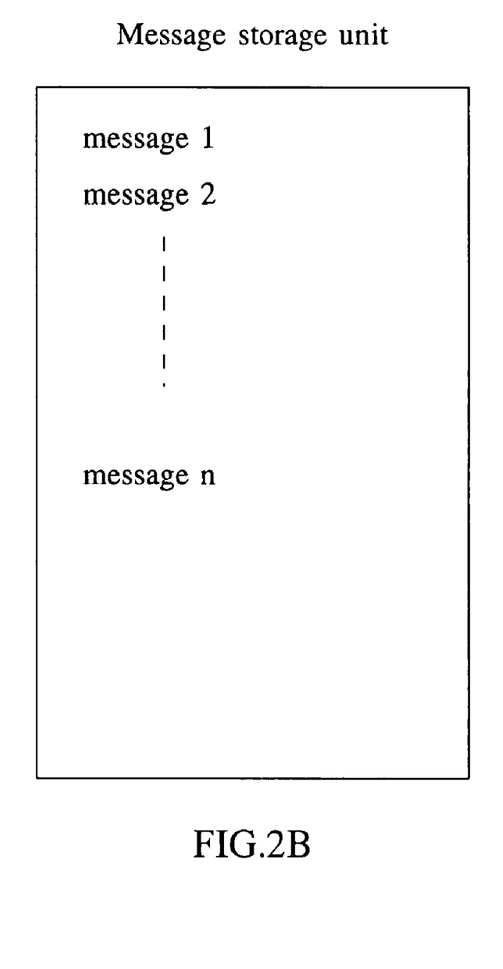
FIG. 2B is a diagram showing example data stored in message storage unit.
Figure 2C:
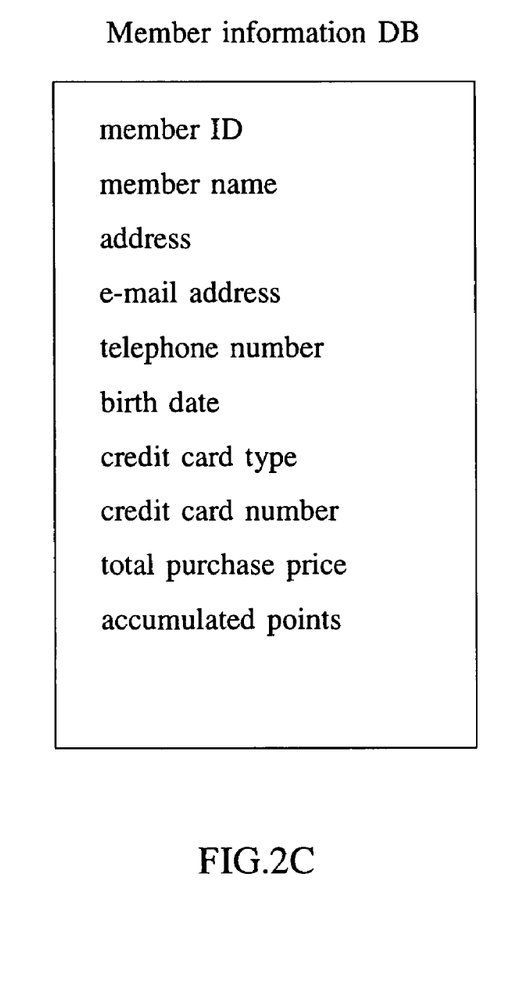
FIG. 2C is a diagram showing example data stored in member information DB.
Figure 2D:
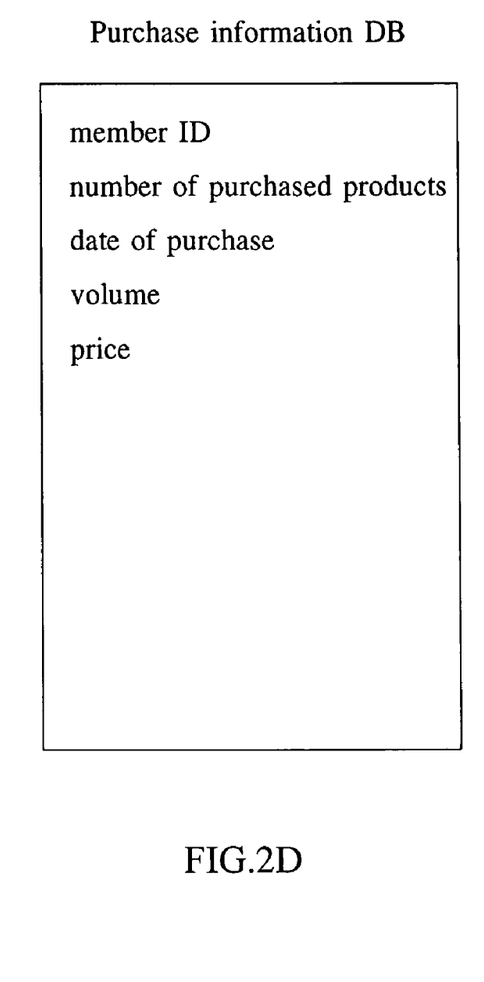
FIG. 2D is a diagram showing example data stored in purchase information DB.

Customer information received at the time of the member registration and the point count provided as a service for a member are stored in the member information DB 95 (FIG. 2C). In this embodiment, the member information includes, for each member, a member ID, a member name, an address, an e-mail address, a telephone number, a birth date, a credit card type, a credit card number, a total purchase price, and accumulated points. The information transmitted by the POS terminal 3 is stored in the purchase information DB 97 (FIG. 2D), so that each time a product is purchased, the member ID of the purchaser, the number of the purchased product, the date of purchase, the volume, and the price are stored.

The customer terminal 11 is a PDA (Personal Digital Assistant), a notebook computer, or a cellular phone that communicates by radio by employing the Bluetooth communication standards, as described above. The customer terminal 11 includes a display device, and a virtual town image, wherein the icon of the retail store, with which the customer has been registered as a member using the customer terminal 11, is freely located, is shown on the display device. The customer terminal 11 includes a function for managing the retail store information received from the retail store terminal 1 in the virtual town.

Figure 3A:
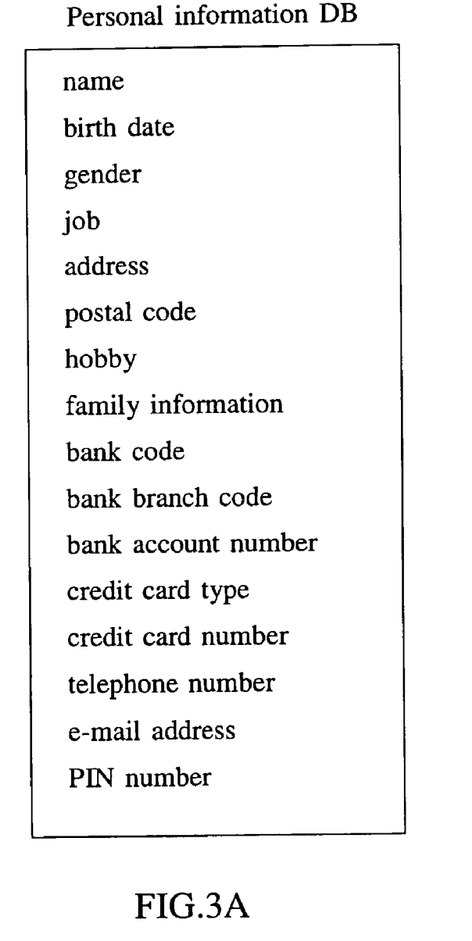
FIG. 3A is a diagram showing example data stored in personal information DB.
Figure 3B:
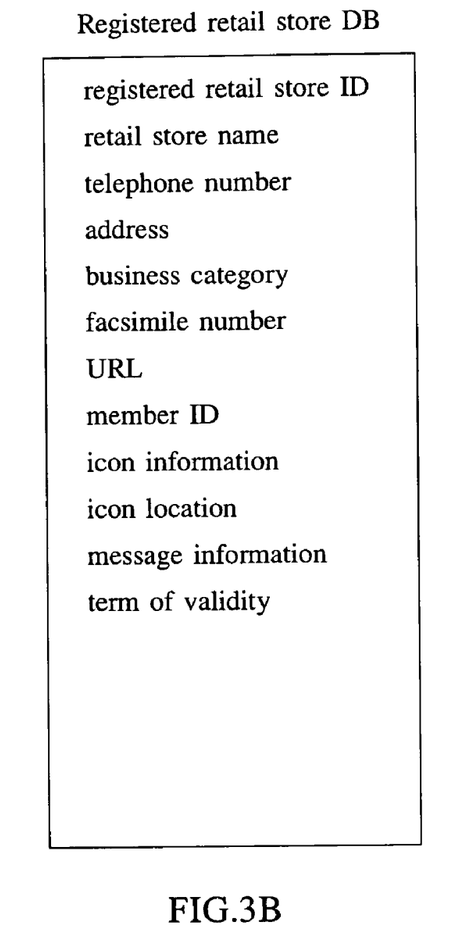
FIG. 3B is a diagram showing example data stored in registered retail store DB.

The customer terminal 11 includes a storage device (not shown) in which an example of the information shown in FIGS. 3A and 3B is stored. The storage device in the customer terminal 11 also includes a personal information DB and a registered retail store DB. The information stored in the personal information DB (FIG. 3A) includes the name of the owner of the customer terminal 11, a birth date, a gender, a profession, an address, a postal code, a hobby, a family information, a bank code, a bank branch code, a bank account number, a credit card type, a credit card number, a telephone number, an e-mail address, and a PIN number. The bank code, the branch code, the bank account number, the credit card type and the credit card number may not be registered so that a payment transaction using these entries is either not performed by the customer terminal 11, or is performed separately. Other entry data can be added or the entry or entries described above may be deleted as needed.

The information for the retail stores registered in the customer terminal 11 is stored in the registered retail store DB (FIG. 3B), and includes, for each retail store, a registered retail store ID, a retail store name, a telephone number, an address, a business category, a facsimile number, a URL, the term of validity, a member ID for the retail store, icon information (or a pointer to an icon file), the icon location in a virtual town, and message information concerning the retail store.

The customer PC 13, as well as the customer terminal 11, has a function for managing the virtual town, and can display an image of the town. Further, the PC 13 can employ the Bluetooth communication standards to perform radio communication. For example, the customer PC 13 may transmit the registered retail store information to the customer terminal 11, or may receives the retail store information registered in the customer terminal 11. The customer PC 13 can also access to the retailer server 5 via the network 7.

A brief overview of the processing performed by the system in FIG. 1 will now be given. When a customer carrying a customer terminal 11 visits a store, near the retail store terminal 1 the customer instructs the customer terminal 11 to initiate member registration. Then, the customer terminal 11 begins radio communication with the retail store terminal 1. In this embodiment, the member registration is performed using a process that will be described later. During this process, the retail store terminal 1 transmits, to the customer terminal 11, items of personal information required for member registration, and the customer terminal 11 retrieves the corresponding personal information from the personal information DB and transmits it to the retail store terminal 1. Thus, the customer can register the necessary information for each store, without doing it consciously.

If the member is registered in the member information DB 95, the retail store information held in the retail store information storage unit 91 and the message stored in the message storage unit 93 are transmitted from the retail store terminal 1 to the customer terminal 11. As shown in FIG. 2, in addition to basic information concerning the store, the retail store information includes the icon of the retail store as well as an advertisement. The customer terminal 11 stores the received retail store information and message in the registered retail store DB (FIG. 3B), and at this time, the display location at which the icon of the retail store is displayed in the virtual town is also registered. It is also possible that the location at which the icon of the retail store is displayed is registered as, for example, an initial location (0, 0). If another icon is already present at the initial location, the positioning is shifted a little along the X or Y axis, e.g., (10, 0) or (20, 0), that position is defined as the display location. The customer can freely move the icon of the retail store around the virtual town.

The customer then returns home carrying his or her customer terminal 11, and makes it communicate with the customer PC 13. At this time, the retail store information (including the icon information) and the message that were newly registered in the registered retail store DB of the customer terminal 11 are transferred to the customer PC 13. Since the customer PC 13 also has a management function of the virtual town, the retail store information and the message are registered in the customer PC 13.

If the customer moves the cursor to the icon of the retail store in the virtual town displayed on the display of the customer PC 13, the message registered for the retail store is displayed. Further, if the customer clicks on the icon of the store, the customer PC 13 can access to the retailer server 5 via the network 7, and can obtain the latest retail store information. If, in addition to the customer PC 13, the customer terminal 11 has a function for connecting with the network 7, the customer terminal 11 can be used to perform the same process.

In addition, the customer can use the customer terminal 11 to request that the retail store terminal 1 provide the data for the current point value. The customer terminal 11 may also, for example, be used to communicate with the POS terminal 3 to pay for a purchase.

Figure 4:
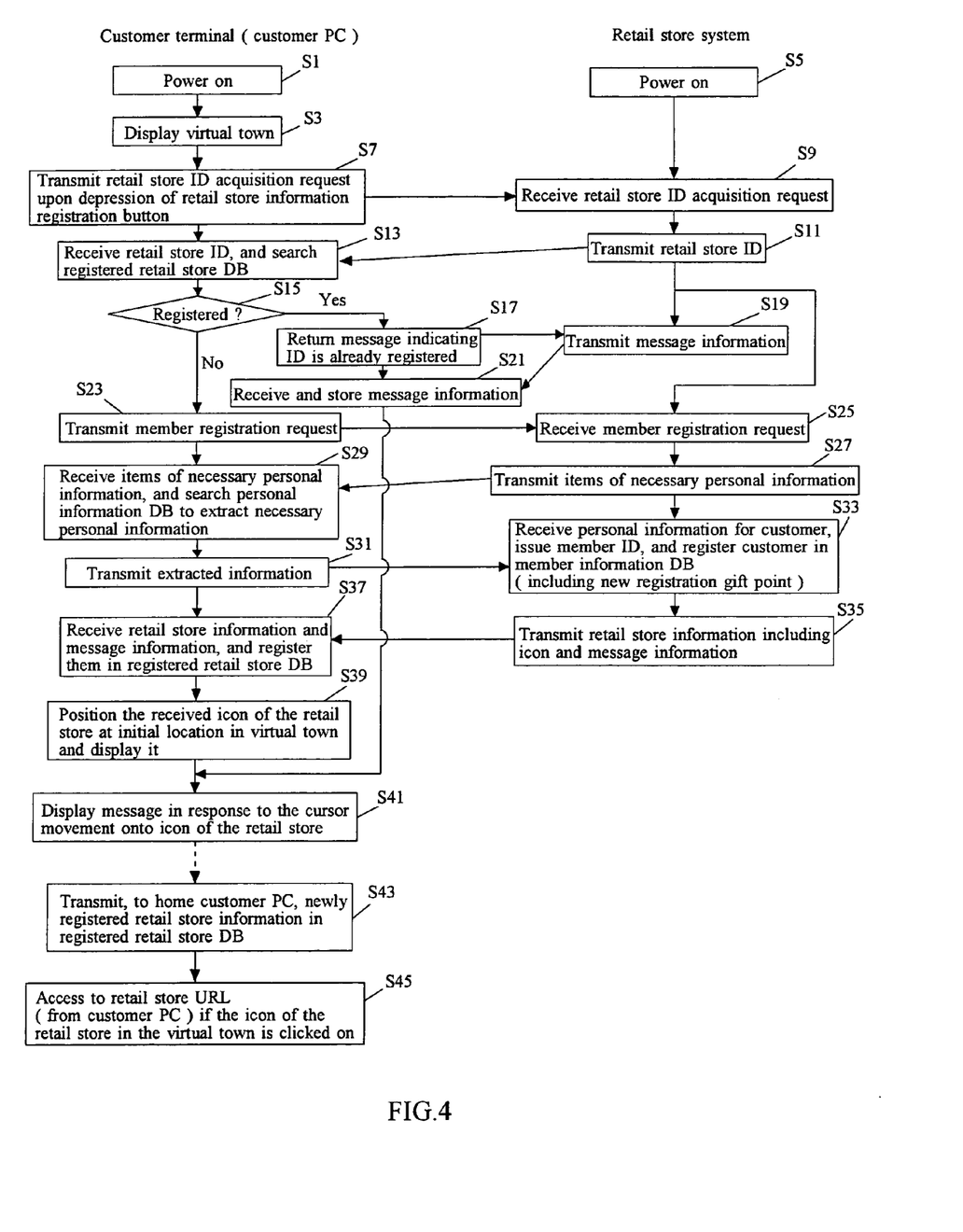
FIG. 4 is a flowchart showing the member registration processing.
Figure 5:
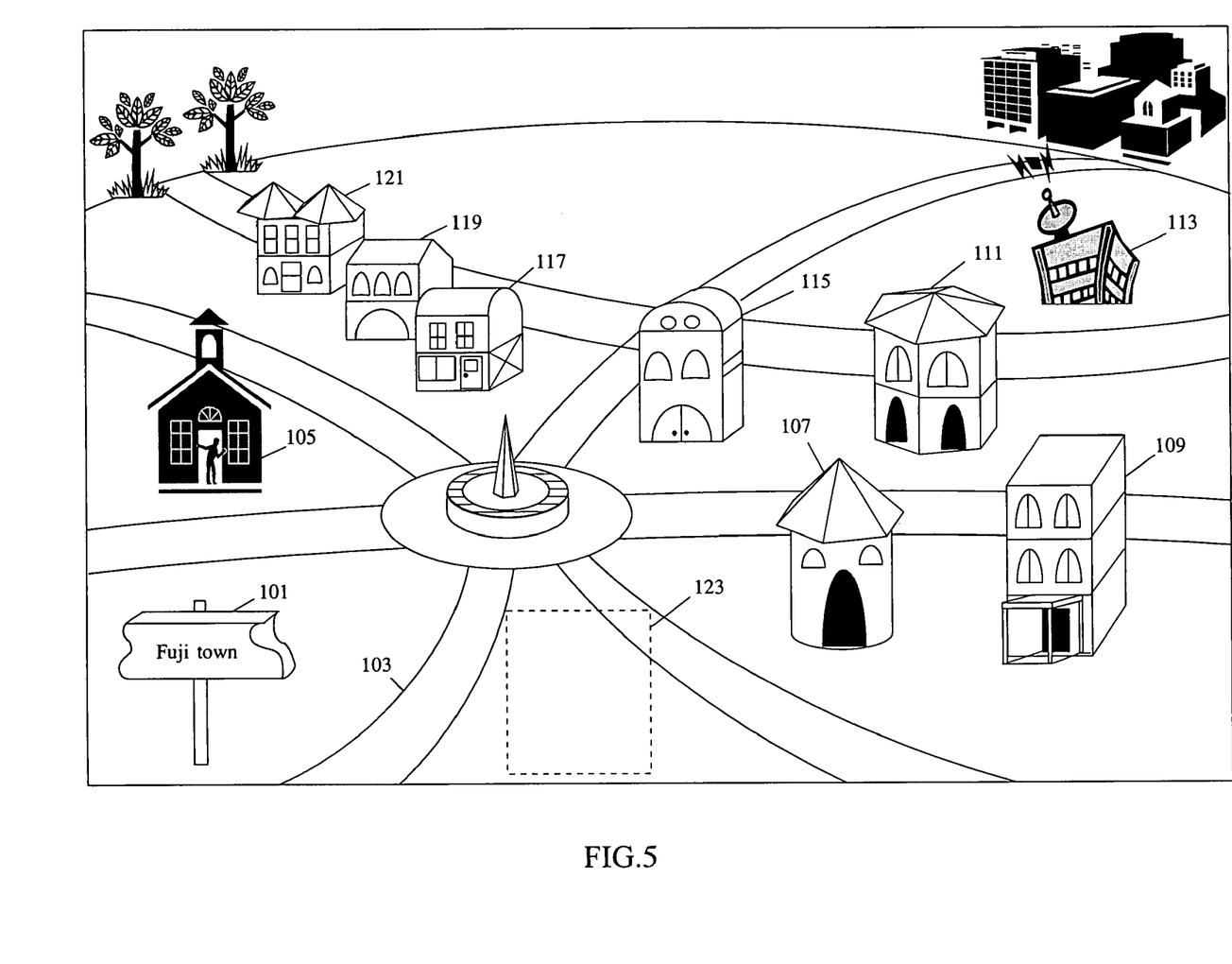
FIG. 5 is a diagram showing an example virtual town (before member registration)

The processing will now be described in detail while referring to FIGS. 4 to 8. First, the customer terminal 11 is powered on (step 91). Following which the virtual town, an example of which is shown in FIG. 5, is displayed on the display device of the customer terminal 11 (step S3). Included in the display is a signboard 101, which represents the customer, in this case a customer "Fuji", who is the manager of the virtual town. A virtual road 103, along which a home delivery truck is traveling, is laid across the town; the presence of the truck meaning that a package is now en route for delivery to the subject customer. Arranged at various locations in the display are multiple icons 105 to 121 for stores or facilities, and a broken-line frame 123 indicates the initial location of the most recently acquired icon. Therefore, the icons 105 to 121 are positioned at desired locations by the customer. The icon may be either 3D or 2D, and an airplane or a blimp may fly over the virtual town to display an advertisement for a company.

When the customer visits the store and depresses, near the retail store terminal 1, the retail store information registration (or member registration) button on the customer terminal 11, the customer terminal 11 transmits a request to the retail store terminal 1 for the acquisition of a retail store ID (step S7). Then, the system on the retail store side is also powered on (step S5), and the retail store terminal 1 receives the retail store ID acquisition request from the customer terminal 11 (step S9). Upon receipt of the retail store ID acquisition request, the retail store terminal 1 obtains the retail store ID from the retail store information storage unit 91 in the storage device 9, which is connected to the retailer server 5, and transmits the obtained retail store ID to the customer terminal 11 (step S11). The retail store terminal 1 may store its own retail store ID.

When the customer terminal 11 receives the retail store ID from the retail store terminal 1, the customer terminal 11 searches the registered retail store DB using the retail store ID (step S13) to determine whether the retail store information for the received retail store ID has been registered in the customer terminal 11 (step S15). If the retail store information has already been stored in the customer terminal 11, information indicating the customer terminal 11 has been registered is transmitted to the retail store terminal 1 (step S17). Upon receipt of the information, the retail store terminal 1 obtains, from the message storage unit 93, a message that includes the latest advertisement, and transmits the message to the customer terminal 11 (step S19). The customer terminal 11 receives the message information from the retail store terminal 1, and stores this information in a storage area corresponding to the retail store ID in the registered retail store DB (step S21).

If the retail store ID is not registered in the registered retail store DB, the customer terminal 11 transmits a member registration request to the retail store terminal 1 (step S23). The member registration request includes a request for transmitting the items of personal information required for the member registration. The retail store terminal 1 receives the member registration request (step S25), and transmits, to the customer terminal 11, the items of personal information required for the member registration (step S27). The items of the personal information may be prepared in advance in the retail store terminal 1, or may be obtained from the member information DB 95. The customer terminal 11 receives, from the retail store terminal 1, the items of personal information required for the member registration, searches the personal information DB, and extracts the personal information corresponding to these items (step S29). Then, the customer terminal 11 transmits the extracted personal information to the retail store terminal 1 (step S31).

The retail store terminal 1 receives the personal information for the customer from the customer terminal 11, and issues a member ID. The received personal information and the member ID are registered in the member information DB 95 of the storage device 9, which is connected to the retailer server 5 (step S33). If this retailer provides a sales point service, a gift point for a new registration may be registered in the member information DB 95. The retail store terminal 1 respectively obtains the retail store information which includes the icon of the retail store, and the message information from the retail store information storage unit 91 and the message storage unit 93 in the storage device 9, which is connected to the retailer server 5, and transmits the retail store information and the message information together with the member ID to the customer terminal 11 (step S35).

Figure 6:
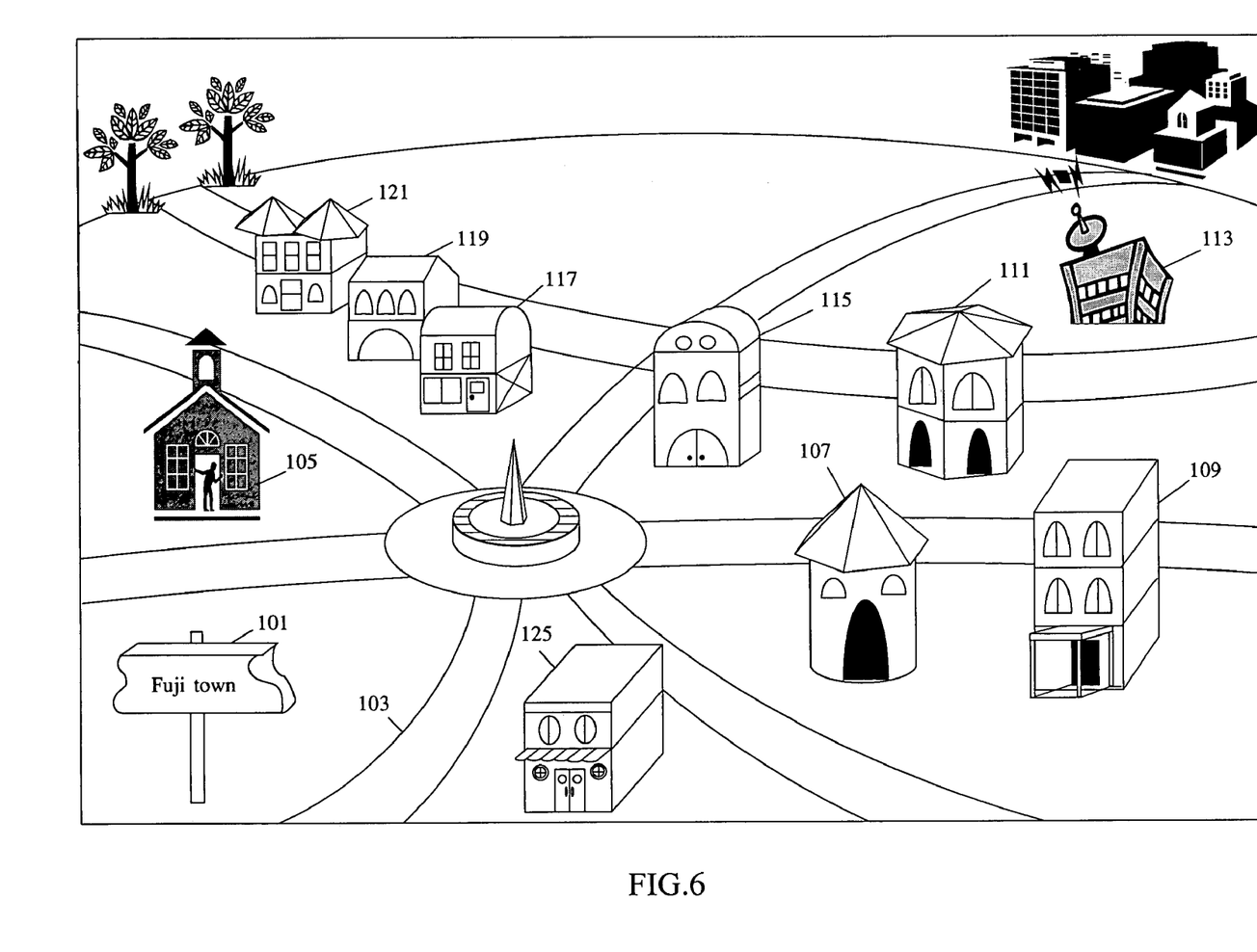
FIG. 6 is a diagram showing an example virtual town (after member registration)

The customer terminal 11 receives, from the retail store terminal 1, the member ID, the retail store information and the message information, and registers them in the registered retail store DB (step S37). The customer terminal 11 then displays, on the display device, the image wherein the received icon of the retail store is positioned at the initial location in the virtual town, as shown in FIG. 6 (step S39). A difference between FIG. 5 and FIG. 6 is that an icon 125 for the recently registered retail store is displayed at the location of the broken-line frame 123 in FIG. 5, which represents the initial location for the icon of the retail store. When the icon of the retail store included in the retail store information is received from the retail store terminal 1, the customer terminal 11 registers this icon in the virtual town, and the icon is positioned at the initial location.

When the customer employs a pen, for example, to move the cursor to the icon 125, the message information provided by the retail store registered in the registered retail store DB is displayed (step S41). For example, a dialogue balloon containing a message may be opened above the icon of the retail store. When the customer clicks on the icon 125 of the retail store using a pen, if the customer terminal 11 includes a communication function for connecting to the network 7, the customer terminal 11 will be connected to the network 7 and will access to the retailer server 5. Thus, the latest advertisement information can be obtained from the retailer server 5, and detailed information concerning a message that is displayed in the virtual town in association with the icon of the retail store can also be obtained.

The processing performed if the customer returns home from the retail store will now be described. Upon returning home, the customer transmits, to the customer PC 13 installed in his or her home, the retail store information that has been newly registered in the registered retail store DB of the customer terminal 11 and that includes the icon of the retail store (step S43). Message information in addition to the retail store information may also be transmitted to the customer PC 13. Thereafter, the virtual town management function of the customer PC 13 registers the retail store information received from the customer terminal 11 in the registered retail store DB, and then displays the virtual town shown in FIG. 6. With the customer PC 13, as well as with the customer terminal 11, if the icon of the retail store in the virtual town is clicked on, the customer PC 13 is connected to the network 7 and accesses to the retail store URL (retailer server 5) included in the retail store information (step S45). By accessing to the retail store URL, product information and event information can be obtained from the retailer server 5. It is also possible that, by registering the icon of the retail store in the virtual town, the customer PC 13 may be automatically connected to the network 7 without the customer having to click on it, and the latest information obtained from the retailer server 5.

Through the above processing, it is only necessary for the customer to depress the retail store information registration (or member registration) button to automatically transmit the necessary information to the retail store terminal 1 to perform the member registration process. Further, since the icon of the retail store included in the retail store information can be registered in the virtual town stored in the customer terminal 11, the retail store information can be more easily obtained.

Furthermore, since the customer terminal 11 can be linked with the customer PC 13 installed at the customer's home, the same state can be attained in the virtual town of the customer PC 13 as is attained in the virtual town of the customer terminal 11.

Figure 7:
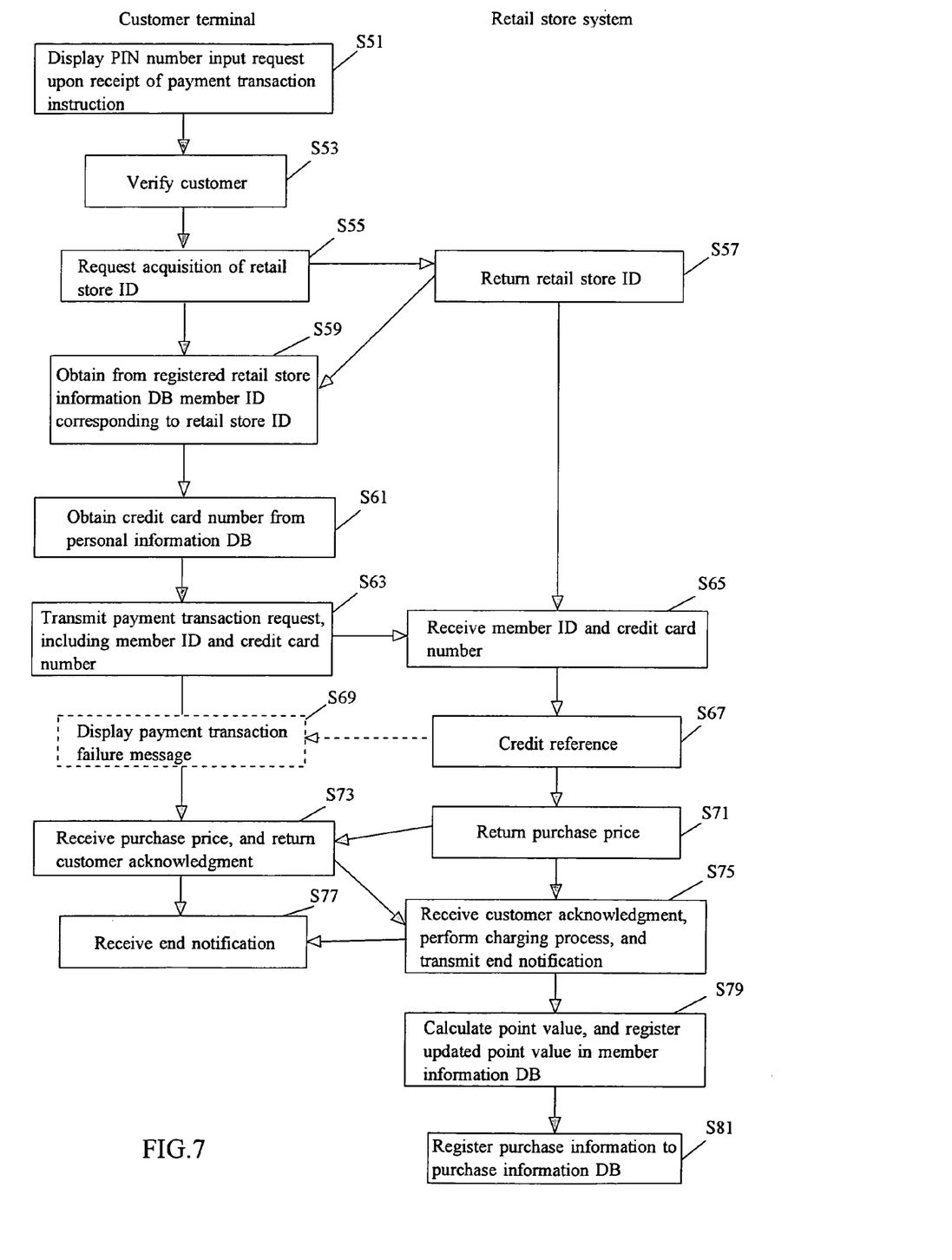
FIG. 7 is a flowchart showing the transaction processing.

The payment transaction process using the customer terminal 11 will now be described while referring to FIG. 7. When the customer depresses a button on the customer terminal 11, or clicks on a button on the display device to issue a payment transaction instruction, the customer terminal 11 displays a PIN number input request on the display device (step S51). When the customer enters his or her PIN number, the customer terminal 11 performs the customer verification (step S53). That is, it is checked whether the input PIN number matches that registered in the personal information DB. If the customer verification fails, the input of the PIN number is again requested, or a message is displayed that the customer verification failed and the payment transaction instruction is invalid. If the customer verification is successful, the customer terminal 11 transmits the retail store ID acquisition request to, for example, the POS terminal 3 (step S55). Upon the receipt of the retail store ID acquisition request, the POS terminal 3 returns the retail store ID to the customer terminal 11 (step S57).

The customer terminal 11 examines the registered retail store DB using the received retail store ID, and obtains the member ID stored in correlation with the retail store ID (step S59). The credit card number (and the credit card type, as needed) is also obtained from the personal information DB (step S61). A payment transaction request, including the member ID and the credit card number, is transmitted to the POS terminal 3 (step S63). If the retailer provides a point service, the customer terminal 11 requests the current point value for the POS terminal 3, and an instruction as to whether paying with the point value or not may be issued. The processing to request the current point value will be described later. If the credit card number is registered with the retailer at the member registration time, the credit card number may not be transmitted at this stage. It might be an idea for the credit card number to be registered with a reliable retailer at the time of the member registration, since if the credit card number is transmitted for each payment transaction, the possibility is greater that an unauthorized person on the periphery of the POS terminal 3 may, using a wire-tap, be able to intercept the communication. Thus, depending on the case, the credit card number may be registered at the time of the member registration. Further, in order to render wire-tapping ineffective, cryptography should be employed for the transmission of the credit card number.

When the POS terminal 3 receives the member ID and the credit card number from the customer terminal 3 (step S65), the credit reference of the credit card number is performed (step S67). For this, CAFIS (Credit And Finance Information Switching System), for example, is employed, and if CAFIS approval is not obtained for the credit card number, the POS terminal 3 transmits a payment transaction failed message to the customer terminal 11, which thereafter displays on the display device a message indicating a payment transaction failure (step S69). If CAFIS approval is obtained, however, the POS terminal 3 transmits the price of the product to the customer terminal 11 for confirmation (step S71), and the customer terminal 11, upon the receipt of the price from the POS terminal 3, displays it on the display device (step 73). The customer can then depress or click on the confirmation button if no problem is noted, and the customer terminal 11 will then transmit an acknowledgment message to the POS terminal 3. But if the customer does not agree with the price that is quoted, he or she can halt the processing, e.g., can instruct the customer terminal 11 to halt the payment transaction. The price confirmation process may also be performed before the credit reference processing. That is, step S67 may be performed during the processing at step S75.

When the POS terminal 3 receives the acknowledgment entered by the customer, it performs the charging process, which includes a process for recording the charge data in the storage device 9 to transmit it to the credit card company. Thereafter, a process end notification is transmitted to the customer terminal 11 (step S75), which, upon the receipt of the process end notification, displays the process end message on the display device (step S77). The POS terminal 3 then calculates a point value corresponding to the price, adds the obtained point value to the previous points, and stores the updated point value in the storage area for the subject member ID in the member information DB 95 of the storage device 9 (step S79). Furthermore, the member ID, the number of the product purchased, the purchase date, the volume and the charge are registered in the purchase information DB 97 (step S81).

Through this processing, the customer can pay for a product using the customer terminal 11, and can also obtain an additional point, or points while the retailer can accurately record the purchase history information for the customer.

Figure 8:
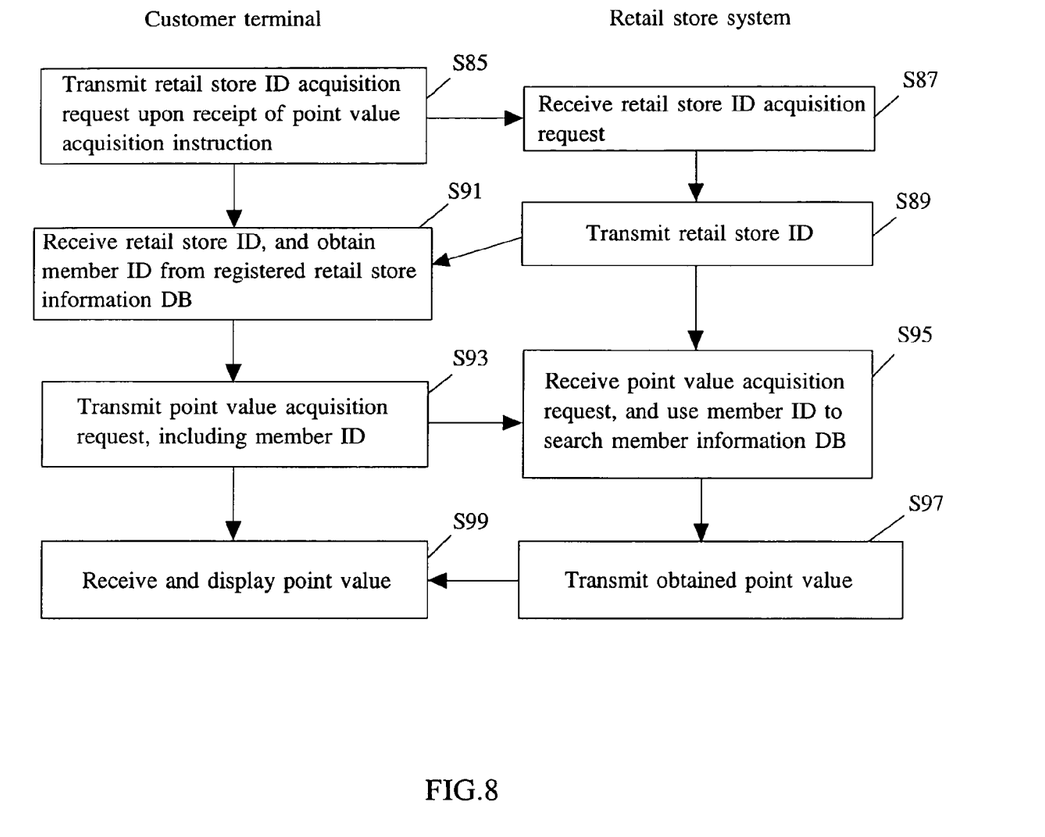
FIG. 8 is a flowchart showing the point value reference processing.

The current point value reference processing will now be described while referring to FIG. 8. When the customer depresses the point value acquisition button of the customer terminal 11, or depress or clicks on the button on the display screen, the customer terminal 11 transmits the retail store ID acquisition request, which may also be transmitted to the POS terminal 3, to the retail store terminal 1 (step S85). When the retail store terminal 1 receives the retail store ID acquisition request (step S87), it transmits the retail store ID to the customer terminal 11 (step S89), which, upon the receipt of the retail store ID, obtains the member ID corresponding to the retail store ID from the retail store information DB 91 for the storage device 9, which is connected to the retailer server 5 (step S91). Then, the customer terminal 11 transmits to the retail store terminal 1 the point value acquisition request, including the member ID (step S93).

When the retail store terminal 1 receives the point value acquisition request, it searches the member information DB 95 of the storage device 9 by using the received member ID (step S95). Then, the retail store terminal 1 extracts a point value corresponding to the received ID from the member information DB 95, and transmits the extracted point value to the customer terminal 11 (step S97). Subsequently, the customer terminal 11 displays the received point value on the display device (step S99).

As a result, the customer can obtain the point value, and can, for example, pay by these points when purchasing a product.

The above described system can be implemented by installing a special program on an ordinary computer. In this case, the program is stored on a storage medium, such as a floppy disk, a CD-ROM or a magneto-optical disk, or in a storage device, such as a semiconductor memory or a hard disk, while the intermediate processing results are temporarily stored in the memory.

The above embodiment is merely an example, and the present invention can be variously modified. For example, in this embodiment the retailer server 5 has a web server function; however, a separate web server may be provided that is connected to the network 7. Further, the retail store terminal 1 may not always be a terminal that can retrieve information concerning a retailer, and may instead be a personal computer that only performs member registrations and point value reference. In addition, although in this embodiment the storage device 9 is connected to the retailer server 5, a storage device may instead be provided for the retail store terminal 1 for the storage of all or part of the contents of the storage device 9. Furthermore, the customer PC 13 is not necessarily provided, i.e., the customer may choose to employ only the customer terminal 11. Furthermore, the design of the image of the virtual town in FIG. 5 or 6 is merely an example, and another design may be employed.

According to the present invention, a technique can be provided for enabling customers to register themselves for the product or service providers without tiresome procedures.

Further, a technique can be provided for enabling computers used by customers to effectively notify the customer of the presence of the product or service providers.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer comprising:
   means for receiving an item of personal information necessary for a member registration from a computer of a product or service provider if performing the member registration;
   means for extracting, from a storage device storing personal information for a customer in advance, personal information for the customer, which corresponds to said item of said personal information received from said computer of said product or service provider, in response to receiving said item of said personal information necessary for the member registration, and for transmitting the extracted personal information to said computer of said product or service provider;
   means for receiving, from said computer of said product or service provider, member identification information as a result of the member registration, and for storing said member identification information in the storage device storing the personal information for the customer in advance;
   means for receiving, from said computer of said product or service provider, information concerning said product or service provider and an icon of said product or service provider, and for storing said information concerning said product or service provider and the icon of the product or service provider in the storage device; and
   display processing means for displaying, on a display device, an image in which icons of product or service providers, to which said customer has been registered as a member, are located in a virtual town of said customer.

2. A member registration program embodied on a medium, said member registration program controlling a computer according to a process comprising:
   receiving, from a computer of a product or service provider, an item of personal information necessary for a member registration if performing the member registration;
   extracting, from a storage device storing personal information for a customer in advance, personal information which corresponds to said item of said personal information received from said computer of said product or service provider, in response to receiving said item of said personal information necessary for the member registration, and transmitting the extracted personal information to said computer of said product or service provider;
   receiving, from said computer of said product or service provider, member identification information as a result of the member registration, and storing said member identification information in said storage device storing the personal information for the customer in advance;
   receiving, from said computer of said product or service provider, information concerning said product or service provider and an icon of said product or service provider, and storing said information concerning said product or service provider and the icon of the product or service provider in the storage device; and displaying, on a display device, an image in which icons of product or service providers, to which said customer has been registered as a member, are located in a virtual town of said customer.

3. A member registration method comprising:

receiving, from a computer of a product or service provider, an item of personal information necessary for a member registration if performing the member registration;

extracting, from a storage device storing personal information for a customer in advance, personal information which corresponds to said item of said personal information received from said computer of said product or service provider, in response to receiving said item of said personal information necessary for the member registration, and transmitting the extracted personal information to said computer of said product or service provider;

receiving, from said computer of said product or service provider, member identification information as a result of the member registration, and storing the member identification information in said storage device storing the personal information for the customer in advance;

receiving, from said computer of said product or service provider, information concerning said product or service provider and an icon of said product or service provider, and for storing said information concerning said product or service provider and the icon of the product or service provider in the storage device; and displaying, on a display device, an image in which icons of product or service providers, to which said customer has been registered as a member, are located in a virtual town of said customer.

* * * * *